United States Patent
Hui et al.

(10) Patent No.: US 9,100,963 B2
(45) Date of Patent: Aug. 4, 2015

(54) TIME SLOT SHARING IN TDMA COMMUNICATION SYSTEM

(75) Inventors: Dennis Hui, Sunnyvale, CA (US); Miguel Lopez, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 119 days.

(21) Appl. No.: 13/877,518

(22) PCT Filed: Oct. 7, 2010

(86) PCT No.: PCT/SE2010/051082
§ 371 (c)(1),
(2), (4) Date: Apr. 3, 2013

(87) PCT Pub. No.: WO2012/047140
PCT Pub. Date: Apr. 12, 2012

(65) Prior Publication Data
US 2013/0308616 A1 Nov. 21, 2013

(51) Int. Cl.
*H04B 7/212* (2006.01)
*H04J 3/00* (2006.01)
(Continued)

(52) U.S. Cl.
CPC ............ *H04W 72/0446* (2013.01); *H04L 27/18* (2013.01); *H04L 1/08* (2013.01); *H04W 28/04* (2013.01)

(58) Field of Classification Search
USPC .......................................................... 370/337
See application file for complete search history.

(56) References Cited

U.S. PATENT DOCUMENTS 6,873,613 B1 * 3/2005 Dent .............................. 370/347
8,290,077 B1 * 10/2012 Ben-Eli et al. ................ 375/261

(Continued)

FOREIGN PATENT DOCUMENTS

| EP | 2157752 A2 | 2/2010 |
|----|------------|--------|
| WO | 2009055636 A2 | 4/2009 |

(Continued)

OTHER PUBLICATIONS

3rd Generation Partnership Project. 3GPP TS 45.001 V9.2.0. 3rd Generation partnership Project; Technical Specification Group GSM/EDGE Radio Access Network; Physical layer on the radio path; General description (Release 9). Mar. 2010.

3rd Generation Partnership Project. 3GPP TS 45.004 V9.1.0. 3rd Generation Partnership Project; Technical Specification Group GSM/EDGE Radio Access Network; Modulation (Release 9). May 2010.

(Continued)

*Primary Examiner* — Edan Orgad
*Assistant Examiner* — Sithu Ko
(74) *Attorney, Agent, or Firm* — Murphy, Bilak & Homiller, PLLC

(57) ABSTRACT

The embodiments of the present invention relate to a method in a transmitting unit; a method in a receiving unit; a transmitting unit and a receiving unit, in a wireless communication network employing Time Division Multiple Access, TDMA, for transmitting and, receiving and demodulating data, respectively, the data being transmitted in a signal comprising a burst, wherein bursts relating to $N_{MS}$ number of mobile stations are multiplexed into a single time slot. The transmission comprises grouping a block of N b number of user code bits, representing the data to be transmitted, into $N_{DS}/N_{MS}$ groups of user code bits. Mapping the groups of user code bits to data symbols such that one group is represented by one data symbol, thereby obtaining a block of data symbols, wherein each data symbol is drawn from one or more pre-defined complex-valued symbol constellation(s). The transmission further comprises repeating the block of data symbols, such that the burst to be transmitted comprises $N_{MS}$ number of equal blocks of data symbols, rotating the $N_{MS}$ number of blocks of data symbols according to a mobile-station-specific rotation, and transmitting the rotated blocks of data symbols in a burst in the time slot.

19 Claims, 8 Drawing Sheets

(51) Int. Cl.

| | | |
|---|---|---|
| *H04Q 7/20* | (2006.01) | |
| *H04L 5/12* | (2006.01) | |
| *H04W 72/04* | (2009.01) | |
| *H04L 27/18* | (2006.01) | |
| *H04L 1/08* | (2006.01) | |
| *H04W 28/04* | (2009.01) | |

(56) References Cited

U.S. PATENT DOCUMENTS

| | | | |
|---|---|---|---|
| 2007/0121764 A1* | 5/2007 | Chen et al. | 375/340 |
| 2007/0189415 A1* | 8/2007 | Kawasaki | 375/295 |
| 2008/0159246 A1 | 7/2008 | Niemela | |
| 2010/0081445 A1 | 4/2010 | Aghili et al. | |
| 2010/0203854 A1* | 8/2010 | Yu et al. | 455/127.1 |

FOREIGN PATENT DOCUMENTS

| | | |
|---|---|---|
| WO | 2009096832 A1 | 8/2009 |
| WO | 2009096841 A1 | 8/2009 |
| WO | 2009096842 A1 | 8/2009 |
| WO | 2009117577 A1 | 9/2009 |
| WO | 2010019556 A1 | 2/2010 |
| WO | 2010074631 A1 | 7/2010 |
| WO | 2011015238 A1 | 2/2011 |

OTHER PUBLICATIONS

3rd Generation Partnership Project. "Multi-User Reusing-One-Slot (MUROS)." 3GPP TSG GERAN #36, GP-072027, Agenda Item 6.1, 7.1.5.18, Nov. 12-16, Vancouver, Canada.

3rd Generation Partnership Project. "Voice Capacity Evolution with Orthogonal Sub Channels." 3GPP TSG GERAN #36, GP-071792, Agenda Item 6.1, 7.1.5.18, Nov. 12-16, 2007, Vancouver, Canada.

3GPP, , "DTX performance of SACCH for VAMOS", Huawei Technologies Co. LTD. XP-002566226, 3GPP TSG GERAN #41, St. Julians, Malta., Feb. 16-20, 2009, 1-5.

Ali, A.A. et al. "On the Use of Repetition Coding With Binary Digital Modulations on Mobile Channels." IEEE Transactions on Vehicular Technology, Feb. 1989, pp. 14-18, vol. 38, No. 1.

Khairy, M.M. et al. "Asymmetric Modulation and Multistage Coding for Multicasting with Multi-Level Reception over Fading Channels." IEEE Military Communications Conference Proceedings, IEEE Conference Publications, Oct. 31-Nov. 3, 1999, pp. 92-96, vol. 1, Atlantic City, USA.

Loskot, P. et al. "A Family of Rate 1/2 Modified Binary Block Repetition Codes." Conference Record Thirty-Eighth Asilomar Conference on Signals, Systems and Computers, IEEE Conference Publications, Nov. 7-10, 2004, pp. 1985-1989, vol. 2.

* cited by examiner

TIME SLOT SHARING IN TDMA COMMUNICATION SYSTEM

TECHNICAL FIELD

The invention relates generally to communication in a wireless communication network employing Time Division Multiple Access, TDMA. The invention relates in particular to communication wherein bursts from at least two mobile stations are multiplexed into the same time slot.

BACKGROUND

The number of users of the existing wireless communication systems, such as e.g. Global System for Mobile communication (GSM), is constantly increasing. This infers an increased use of the resources of the wireless communication systems. In order to meet the continuous increase of use of the resources, the concept of using Voice services over Adaptive Multi-user channels on One Slot (VAMOS) has been introduced into the GSM standard. According to this concept, the network may multiplex data to/from two wireless transmitting units and/or receiving units. In other words, the two transmitting/receiving units are allocated the same radio resource.

The sub-channels are separated by means of orthogonal training sequences. In the uplink the two sub-channels are not orthogonal, and complex joint detection algorithms are required in order to demodulate the users' data bits. Further, only two users may share the same radio resource at any given time.

Since uplink transmissions are uncoordinated, this solution is based upon co-channel signals that interfere strongly with each other, causing degradation of the link performance. Even in the downlink, each mobile station experiences the paired sub-channel as interference that must be suppressed.

Relevant prior art is disclosed in 3GPP TS 45.001 V9.2.0 (2010-03); Radio Access Network; Physical Layer on the radio path; General Description (Release 9), and in 3GPP TS 45.004 V9.1.0 (2010-05); Radio Access Network; Modulation (Release 9).

SUMMARY

It is an object of the invention to address at least some of the problems outlined above. In particular, it is an object of the invention to transmit data in bursts over a wireless communication network employing Time Division Multiple Access, TDMA, wherein bursts related to a plurality of mobile stations are communicated in a single time slot.

These objects and others may be obtained by providing a method in a transmitting unit, a method in a receiving unit as well as a transmitting unit and a receiving unit.

According to an aspect, a method in a transmitting unit is provided for transmitting data in a burst over a wireless communication network employing Time Division Multiple Access, TDMA. The burst comprises a payload of $N_{DS}$ number of data symbols, such that the data in the burst is represented by a block of data symbols, wherein bursts related to $N_{MS}$ number of mobile stations are communicated in a single time slot.

The method comprises grouping a block of $N_b$ number of user code bits, representing the data to be transmitted, into $N_{DS}/N_{MS}$ groups of user code bits. Further, the method comprises mapping the groups of user code bits to data symbols such that one group is represented by one data symbol, thereby obtaining a block of data symbols, wherein each data symbol is drawn from one or more pre-defined complex-valued symbol constellation(s). Still further, the method comprises repeating the block of data symbols, such that the burst to be transmitted comprises $N_{MS}$ number of equal blocks of data symbols. The method also comprises rotating the $N_{MS}$ number of blocks of data symbols according to a mobile-station-specific rotation. The method comprises transmitting the rotated blocks of data symbols in a burst in the time slot.

This has the advantage that mutual interference can be avoided or reduced when bursts related to the $N_{MS}$ number of mobile stations are multiplexed into the single time slot.

Yet an advantage is that the amount of inter-symbol interference, ISI, is not increased in the received signal while the same amount of frequency diversity is maintained for each user.

Yet an advantage is that the receiver complexity required for demodulating each user's data may stay approximately constant regardless of the number of multiplexed users.

According to an embodiment of the method in a transmitting unit, each of the groups comprises $N_b * N_{MS}/N_{DS}$ number of user code bits.

According to yet an embodiment, the grouping and mapping is performed by modulation with the order of 2 to the power of $N_b * N_{MS}/N_{DS}$.

According to an embodiment, the $N_{MS}$ number of blocks of symbols are rotated by $2\pi(k-1)/N_{DS}$ for mobile station number k, wherein $1 \le k \le N_{MS}$.

According to an aspect, a method in a control node, in a wireless communication network employing Time Division Multiple Access, TDMA, for multiplexing bursts relating to $N_{MS}$ number of mobile stations into a single time slot is provided. The method comprises assigning mobile-station-specific rotations to each of the mobile stations and assigning the single time slot to each of the mobile stations.

According to an embodiment of the method in a control node, the mobile-station-specific rotation for mobile station number k, in relation to other mobile stations in the singe time slot, is $2\pi(k-1)/N_{DS}$, $N_{DS}$ is the number of data symbols in the payload of the burst in the time slot and $1 \le k \le N_{MS}$.

According to an aspect, a method in a transmitting unit is provided for receiving and demodulating data, the received data being transmitted in a signal in a burst over a wireless communication network employing Time Division Multiple Access, TDMA. Bursts relating to $N_{MS}$ number of mobile stations are multiplexed into a single time slot.

The method comprises receiving the signal by way of a plurality of samples and processing the received samples in order to identify which received samples correspond to data symbols in a payload portion of the burst. The method further comprises de-rotating the data samples according to a mobile-station-specific de-rotation, thereby obtaining a block of de-rotated samples. Still further, the method comprises identifying $N_{MS}$ number of sample blocks, within the block of de-rotated samples and combining the $N_{MS}$ number blocks of samples, thereby obtaining one block of samples. The method also comprises demodulating the block of samples to obtain $N_b$ number of hard or soft bit decisions, $N_b$ being a total number of user code bits conveyed by the data symbols in the payload in the received signal samples of the burst, thereby obtaining a block of hard or soft user code bits.

This has the advantage that mutual interference can be avoided or reduced when bursts related to the $N_{MS}$ number of mobile stations are multiplexed into the single time slot.

Yet an advantage is that the amount of inter-symbol interference, ISI, is not increased in the received signal while the same amount of frequency diversity is maintained for each user.

Yet an advantage is that the receiver complexity required for demodulating each user's data may stay approximately constant regardless of the number of multiplexed users.

According to an embodiment of the method in a transmitting unit, the number of user code bits in a group is $N_b*N_{MS}/N_{DS}$.

According to an embodiment of the method in a transmitting unit, the demodulating is performed by demodulation of the signal with a constellation of the order of 2 to the power of $N_b*N_{MS}/N_{DS}$.

According to an embodiment, the $N_{MS}$ number of blocks of symbols are de-rotated by $2\pi(k-1)/N_{DS}$ for mobile station number k, wherein $1 \leq k \leq N_{MS}$.

According to an aspect, a transmitting unit configured for transmitting data in a burst over a wireless communication network employing Time Division Multiple Access, TDMA is provided. The burst comprises a payload of $N_{DS}$ number of data symbols, such that the data in the burst is represented by a block of data symbols, wherein bursts related to $N_{MS}$ number of mobile stations are communicated in a single time slot. The transmitting unit comprises a processing unit adapted to group a block of $N_b$ user code bits, representing the data to be transmitted, into $N_{DS}/N_{MS}$ groups of user code bits. The processing unit is further adapted to map the groups of user code bits to data symbols such that one group is represented by one data symbol, thereby obtaining a block of data symbols, wherein each data symbol is drawn from one or more predefined complex-valued symbol constellation(s). Still further, the processing unit is adapted to repeat the block of data symbols such that the burst to be transmitted comprises $N_{MS}$ number of equal block of data symbols and to rotate the $N_{MS}$ number of blocks of data symbols according to a mobile-station-specific rotation. The processing unit is also adapted to transmit the rotated block of data symbols in a burst in the time slot.

The transmitting unit has the same advantages as the method in the transmitting unit as described above.

According to an embodiment of the transmitting unit, each of the groups comprises $N_b*N_{MS}/N_{DS}$ number of user code bits.

According to yet an embodiment, the processing unit is further adapted to perform the grouping and mapping by modulation with the order of 2 to the power of $N_b*N_{MS}/N_{DS}$.

Further, according to an embodiment, the processing unit is further adapted to rotate the $N_{MS}$ number of blocks of symbols by $2\pi(k-1)/N_{DS}$ for mobile station number k, wherein $1 \leq k \leq N_{MS}$.

According to an aspect, a receiving unit configured for receiving and demodulating data is provided. The received data is being transmitted in a signal comprising a burst over a wireless communication network employing Time Division Multiple Access, TDMA. Bursts relating to $N_{MS}$ number of mobile stations are multiplexed into a single time slot.

The receiving unit comprises a processing unit adapted to receive the signal by way of a plurality of samples and to process the received samples in order to identify which received samples correspond to data symbols in a payload portion of the burst. The processing unit is further adapted to de-rotate the samples according to a mobile-station-specific de-rotation, thereby obtaining a block of de-rotated samples. Further, the processing unit is adapted to identify $N_{MS}$ number of blocks of samples, within the block of de-rotated samples and to combine the $N_{MS}$ number of blocks of samples thereby obtaining one block of samples. The processing unit is also adapted to demodulate the block of samples to obtain $N_b$ number of hard or soft bit decisions, $N_b$ being a total number of user code bits conveyed by the data symbols in the payload in the received signal samples of the burst, thereby obtaining a block of hard or soft user code bits.

The receiving unit has the same advantages as the method in the receiving unit as described above.

According to an embodiment of the receiving unit, the number of user code bits in a group is $N_b*N_{MS}/N_{DS}$.

According to an embodiment of the receiving unit, the processing unit is further adapted to perform the demodulating by demodulation with a constellation of the order of 2 to the power of $N_b*N_{MS}/N_{DS}$.

According to yet an embodiment of the receiving unit, the processing unit is further adapted to de-rotate the $N_{MS}$ number of blocks of symbols by $2\pi(k-1)/N_{DS}$ for mobile station number k, wherein $1 \leq k \leq N_{MS}$.

BRIEF DESCRIPTION OF DRAWINGS

The invention will now be described in more detail by means of exemplary embodiments and with reference to the accompanying drawings, in which.

DETAILED DESCRIPTION

Briefly described, methods in a transmitter, in a receiver and in a control node are provided as well as a transmitting unit and a receiving unit for enabling a plurality of mobile stations to share the same radio resource in a wireless communication network employing TDMA.

Figure 1:
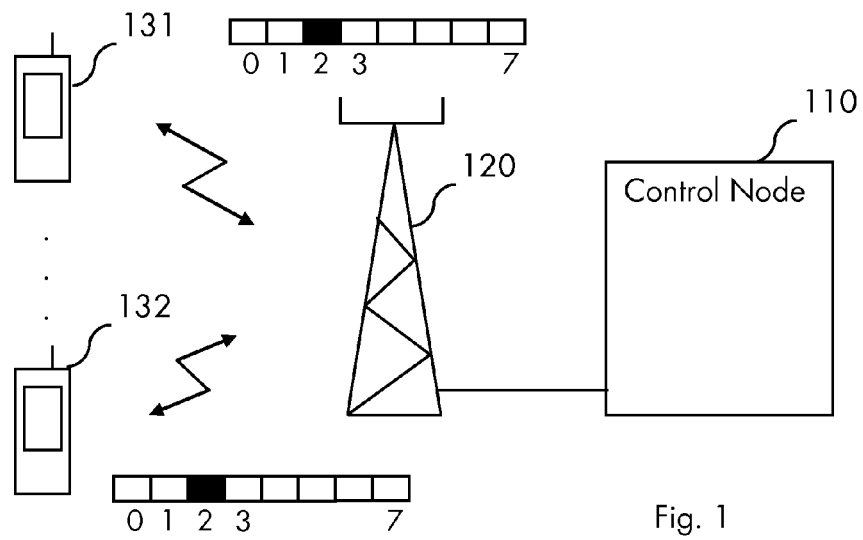
FIG. 1 illustrates a plurality of mobile stations communicating via one base station, the data from each mobile station being multiplexed on one time slot.

FIG. 1 illustrates a plurality of mobile stations 131 and 132 communicating via one base station 120. A control node 110, such as e.g. in GSM, a base station controller controls at least one base station. When a communication session is to be set up between a mobile station and a base station, several actions take place in a call setup procedure. The call setup procedure can be seen as a sort of negotiation procedure comprising among other actions to agree upon which time slot to use in uplink and in downlink, which modulation(s) to employ and so on. The different actions are needed for the mobile station and the base station to be able to "understand" each other.

The mobile stations send and receive data or information in bursts, wherein a mobile station sends/receives one burst in one or more specific time slot(s). This time slot or these time slots have been assigned as described in the call setup procedure.

Depending on the type of Time Division Multiple Access (TDMA), a burst may comprise different fields and/or the fields in the burst may comprise different number of symbols. Hereinafter, the detailed description will describe exemplary embodiments employing GSM/EDGE (Enhanced Data GSM Evolution). It shall be noted that the methods and the transmitting and receiving units defined by the appended claims can be implemented in any TDMA-based communication system.

Figure 2:
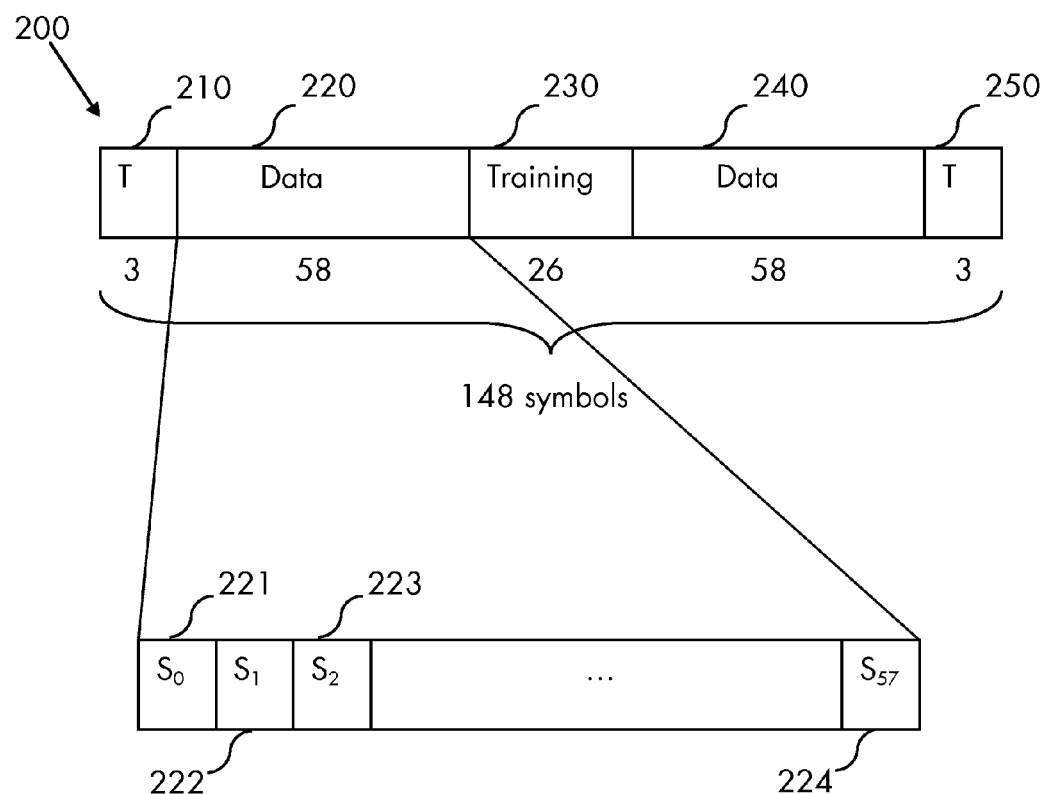
FIG. 2 is an illustration of a burst in a GSM/EDGE communication system.

FIG. 2 illustrates a burst 200 in a GSM communication system using normal symbol rate. The burst comprises two fields of tail symbols 210 and 250, each of 3 symbols. The burst further comprises a field of training symbols 230, $N_T$, of 26 symbols. The burst also comprises two fields of data symbols 220 and 240. Each of the data fields comprises 58 data symbols making the number of total data symbols in a burst 116. This number is referred to $N_{DS}$. In other words, for GSM employing normal symbol rate, $N_{DS}=116$. In a GSM communication system employing high symbol rate, the burst comprises a total of 138 data symbols as payload, or $N_{DS}=138$.

The data symbols in the payload convey a number of data bits. Depending on the kind of signal modulation, one data symbol conveys or represents a specific number of data bits. The GMSK modulation used in GSM can be well approximated by a rotating BPSK modulation. For BPSK (Binary Phase Shift Keying), one symbol corresponds to one bit. With BPSK, the burst may convey 116 data symbols, corresponding to 116 data bits. For 8PSK (Phase Shift Keying), one data symbol corresponds to three data bits. With 8PSK, a burst comprising 116 data symbols in the two payload fields may transfer 348 bits of data. Another example is 16 QAM (Quadrature Amplitude Modulation). For 16 QAM, one data symbol corresponds to four data bits, hence a burst may transfer 464 bits of data. Still the number of data symbols in the burst, that is the number of symbols in the data fields are $N_{DS}=116$, for GSM employing normal symbol rate.

Figure 3:
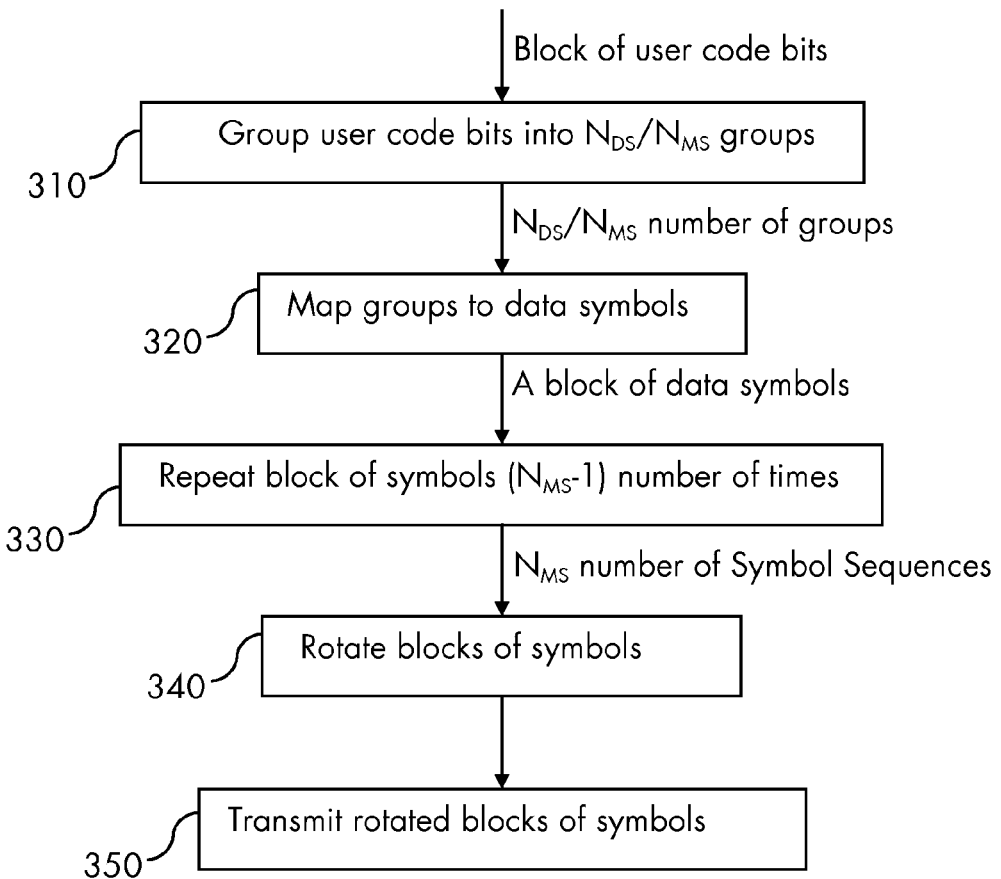
FIG. 3 is a flow chart illustrating an embodiment of a method in a transmitting unit for transmitting data in a burst over a wireless communication network employing TDMA.

FIG. 3 is a flow chart illustrating an embodiment of a method in a transmitting unit for transmitting data in a burst over a wireless communication network employing TDMA. A mobile station is to transmit a block of user code bits in a burst. The block of user code bits comprises $N_b$ number of user code bits. The burst comprises a payload of $N_{DS}$ number of data symbols. Further, a number of $N_{MS}$ mobile stations communicate simultaneously their burst in a single time slot.

As illustrated in FIG. 3, the method in the transmitting unit comprises grouping 310 a block of $N_b$ number of user code bits into $N_{DS}/N_{MS}$ number of groups of user code bits. The user code bits represent the data to be transmitted.

The method further comprises mapping 320 these groups of user code bits to data symbols in such a way that one group of user code bits is represented by one data symbol. Thereby, the block of user code bits are represented by a block of data symbols. Each data symbol is drawn from one or more predefined complex-valued symbol constellation(s).

Further, the method comprises repeating 330 the block of data symbols $N_{MS}-1$ number of times such that the burst to be transmitted comprises $N_{MS}$ number of equal blocks of data symbols.

Still further, the method comprises rotating 340 the $N_{MS}$ number of blocks of data symbols according to a mobile-station-specific rotation and then transmitting 350 the rotated blocks of data symbols in a burst in the time slot.

This has the advantage that mutual interference can be avoided or reduced when bursts related to the $N_{MS}$ number of mobile stations are multiplexed into the single time slot.

The mobile-specific-rotation can be agreed upon in the call setup procedure described above. Alternatively, it may also be agreed upon or later changed by control signaling. Likewise, the number $N_{MS}$ of blocks may be changed by control signaling. This means that the mobile-specific-rotation and the number of block repetitions can be kept the same during a session comprising several bursts and it can also be changed or altered during a session comprising several bursts. It may be advantageous to be able to change the mobile-specific-rotation and the number of blocks in case additional mobile stations will be introduced during the duration of a session comprising several bursts such that one or more additional mobile stations will start transmitting in the same time slot. Likewise, one or more mobile stations may terminate their respective sessions irrespectively of other mobile stations and hence, the number of mobile stations transmitting in the same time slot may decrease. The rotation and the number of repetitions are dependent upon the number of mobile stations transmitting and being multiplexed into the same time slot.

In this the method, each group of user code bits may comprise $N_b*N_{MS}/N_{DS}$ number of code bits. In other words, a group comprises the total number of user code bits a mobile station is to transmit in a burst times the number of mobile stations (whose data is multiplexed into the same time slot) divided by the number of data symbols in the payload of the burst.

Further, in the method, the grouping and mapping may be performed or realized by modulation with the order of 2 to the power of $N_b*N_{MS}/N_{DS}$.

As an example, assume that the number of mobile stations is 2, i.e. $N_{MS}=2$. Assume further that each mobile station is to transmit 116 user code bits, i.e. $N_b=116$. The communication system is GSM employing normal symbol rate, then $N_{DS}=116$. This results in a modulation order of 2 to the power of 2, i.e. $2^2=4$. Then QPSK modulation could be used. This is a minimum requirement on the modulation order. Higher order modulation is possible but will most probably require more resources.

As described above, bursts relating to $N_{MS}$ number of mobile stations may be multiplexed into one single time slot. As stated before, the burst comprises the $N_{MS}$ number of blocks of data symbols rotated according to a mobile-station-specific rotation. For mobile station number k, wherein k is an integer in the interval of $1 \leq k \leq N_{MS}$, the $N_{MS}$ number of blocks of data symbols may be rotated by $2\pi(k-1)/N_{DS}$.

Since bursts relating to $N_{MS}$ number of mobile stations are multiplexed into one single time slot, there are $N_{MS}$ number of different rotation angles. The mobile-station-specific rotation may change for every burst. Let the $N_{MS}$ number of different rotation angles be denoted $a_1, a_2, a_3, \ldots, a_{MS}$. The mobile-station-specific rotation for mobile station number k may change for every burst according to a predetermined pattern. The pattern may be deterministic or pseudo-random. Just as an example, the mobile-station-specific rotation for mobile station number k may be changed according to a pattern of $\{a_k, a_{k+1}, a_k, a_{k+1}, \ldots, a_k, a_{k+1}\}$. According to another example, the pattern may be $\{a_1, a_2, a_3, \ldots, a_{MS}, a_1, a_2, a_3, \ldots, a_{MS}, \ldots, a_1, a_2, a_3, \ldots, a_{MS}\}$. Different mobile station may be assigned different pattern for the mobile-station-specific rotation. However, no two mobile stations will have the same rotation during a burst.

One example of a wireless communication network employing TDMA is GSM. In GSM, the number of data symbols in a burst is 116 at normal symbol rate and 138 at higher symbol rate.

Figure 4:
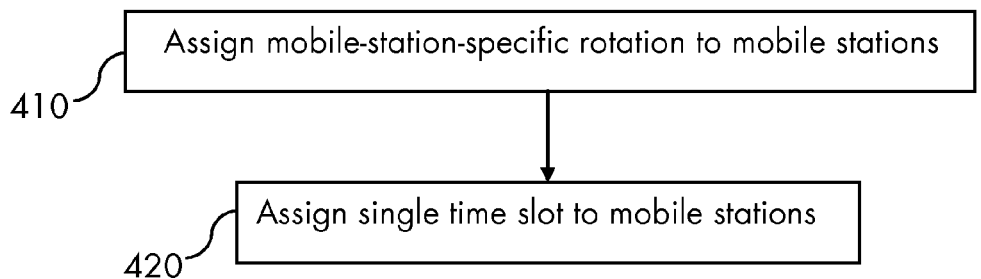
FIG. 4 is a flow chart illustrating an embodiment of a method in a control node for controlling the mobile-station-specific rotations and the assignment of radio resources.

FIG. 4 is a flow chart illustrating an exemplary embodiment of a method in a control node for multiplexing bursts relating to $N_{MS}$ number of mobile stations into a single time slot. An example of such a control node is schematically illustrated in FIG. 1. The control node is a part of a wireless communication network employing TDMA.

FIG. 4 illustrates multiplexing bursts relating to $N_{MS}$ number of mobile stations into a single time slot comprising assigning 410 mobile-station-specific rotations to each of the $N_{MS}$ number of mobile stations. The method further comprising assigning 420 the same time slot to each of the mobile stations. It shall be noted that a frame comprises a plurality of time slots. In GSM, a frame has eight time slots. The $N_{MS}$ different mobile stations are assigned the same time slot or time slots in a frame.

As having been described above, the mobile-specific-rotation for mobile station number k, in relation to other mobile stations in the same time slot, is $2\pi(k-1)/N_{DS}$, wherein $1 \leq k \leq N_{MS}$ and $N_{DS}$ is the number of data symbols in the payload of the burst in the time slot.

Figure 5:
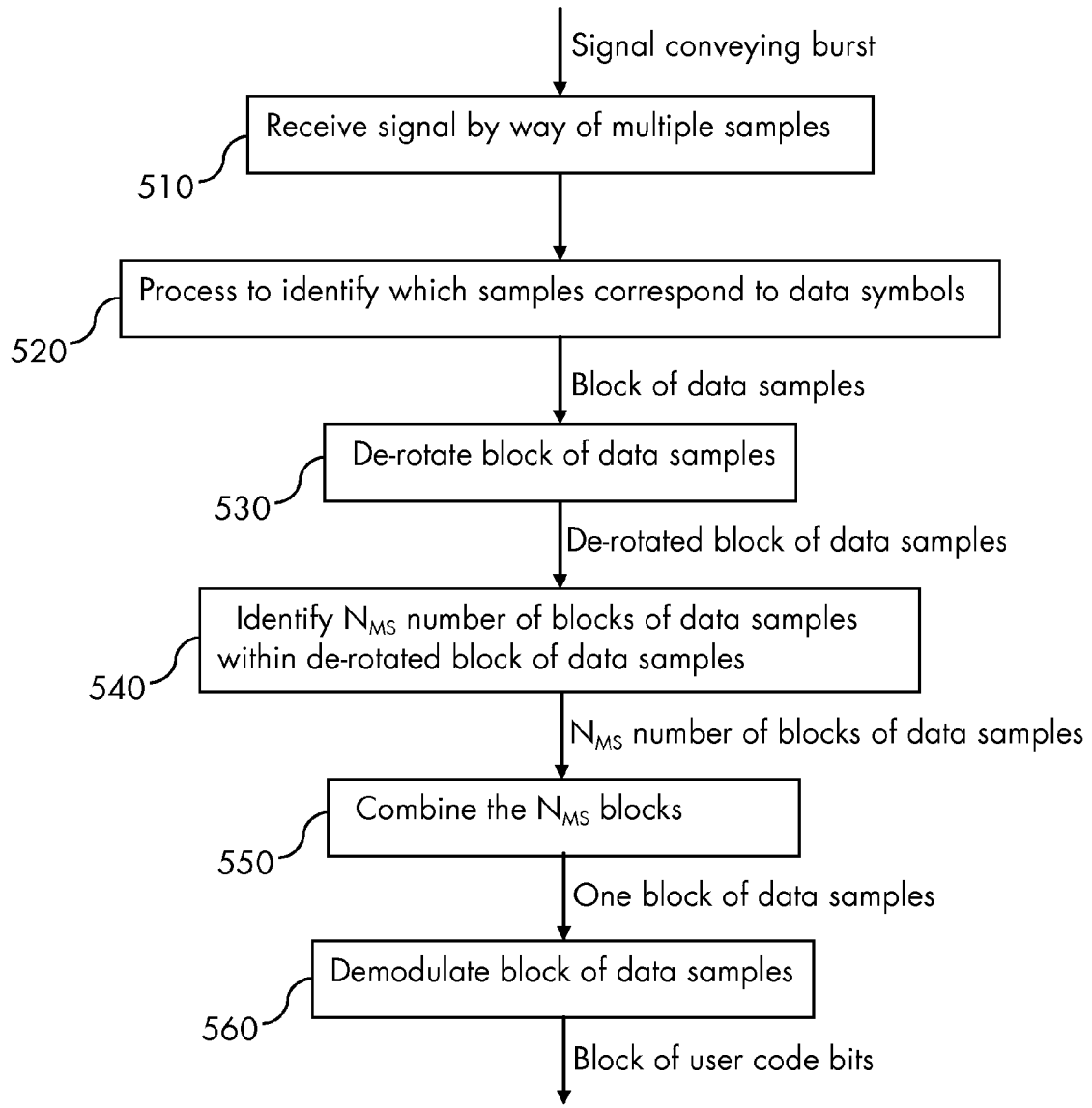
FIG. 5 is a flow chart illustrating an embodiment of a method in a receiving unit for receiving signals comprising data in a burst over a wireless communication network employing TDMA.

FIG. 5 is a flow chart illustrating an exemplary embodiment of a method in a receiving unit for receiving and demodulating data, the received data being transmitted in a signal in a burst over a wireless communication network employing Time Division Multiple Access, TDMA, wherein bursts relating to $N_{MS}$ number of mobile stations are multiplexed into a single time slot.

FIG. 5 illustrates receiving 510 the signal by way of a plurality of samples.

As the receiver has received a plurality of samples, the method comprises processing 520 the received samples in order to identify which received samples correspond to data symbols in a payload portion of the burst. As was described earlier, the burst comprises two portions or fields of payload, the payload comprises data symbols conveying the data that is to be sent.

The method further comprises de-rotating 530 the data samples according to a mobile-station-specific de-rotation, thereby obtaining a block of de-rotated data samples and identifying 540 $N_{MS}$ number of sample blocks, within the block of de-rotated data samples. The $N_{MS}$ number of sample blocks have all the same length.

Still further, the method comprises combining 550 the $N_{MS}$ number of sample blocks, thereby obtaining one sample block. Due to the mobile-station-specific de-rotation, the energy of the signals of the desired contained in the $N_{MS}$ number of sample blocks are combined coherently, thus amplifying the desired signal. At the same time, the mobile-station-specific de-rotation ensures that the energy of the signals of the other users contained in the $N_{MS}$ number of sample blocks are combined destructively, thus suppressing the interference caused by all other users that are multiplexed in the same time slot.

The method comprises demodulating 560 the sample block to obtain $N_b$ number of hard or soft bit decisions, $N_b$ being a total number of user code bits conveyed by the data symbols in the payload in the received signal samples of the burst, thereby obtaining a block of hard or soft user code bits. The demodulation 560 may be performed using a conventional demodulator, similar to that used to demodulate GSM/EDGE bursts.

This has the advantage that mutual interference can be avoided or reduced when bursts related to the $N_{MS}$ number of mobile stations are multiplexed into the single time slot.

In an embodiment of the method in a receiving unit, the number of user code bits in a group is $N_b * N_{MS}/N_{DS}$.

$N_b$, i.e. the number of user code bits, can be agreed upon during the call setup procedure. This would typically be the case for circuit switched voice and data over GSM or for GPRS (General Radio Packet Service).

For EGPRS (Enhanced GPRS) and/or EGPRS2, $N_b$ can be changed over the course of a transmission. In such a case, the receiver does not know the value of $N_b$. Therefore, this value needs to be detected. The receiver may detect the value of $N_b$ on a radio block basis, wherein one radio block consists of four bursts.

The number of user code bits is determined by the modulation order and the symbol rate. Thus the receiver must detect the modulation order and the symbol rate. In order to facilitate the detection, bursts with different modulation orders are rotated by different angles. The receiver detects the most likely rotation angle.

In an exemplary embodiment of the method in a receiving unit, the demodulating is performed by de-modulation using an alphabet or symbol constellation of the order of 2 to the power of $N_b * N_{MS}/N_{DS}$.

According to an example, the $N_{MS}$ number of blocks of symbols are de-rotated by $2\pi(k-1)/N_{DS}$ for mobile station number k, wherein $1 \leq k \leq N_{MS}$.

In an example, the wireless communication network employing TDMA is a GSM system and the $N_{DS}$ number of data symbols is 116 at normal symbol rate or the $N_{DS}$ number of data symbols is 138 at higher symbol rate.

Below, a transmitting unit and a receiving unit employing the above described respective methods, will be described with reference to FIGS. 6 and 7. The transmitting unit and receiving unit may be used to achieve basically the same objects and advantages as the methods described above. The transmitting unit and the receiving unit will only be described briefly for sake of clarity and simplicity.

Figure 6:
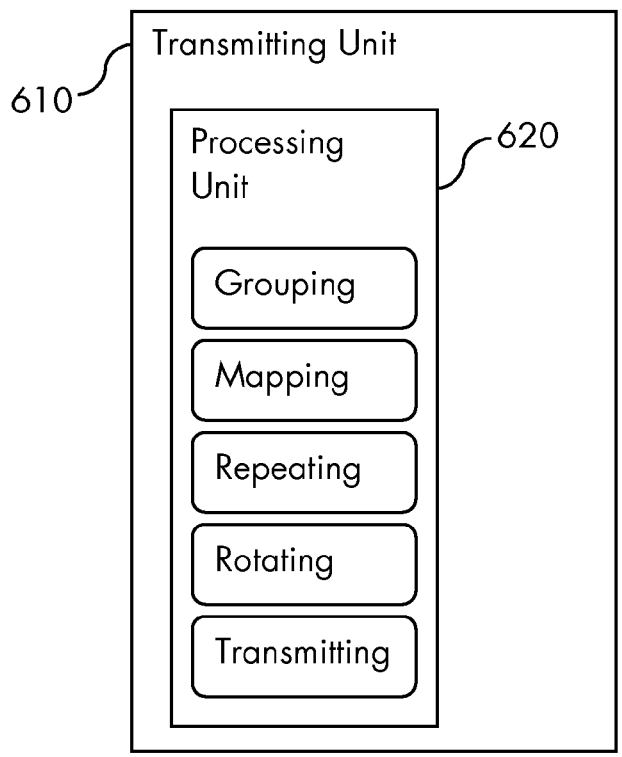
FIG. 6 is a block diagram illustrating a Transmitting Unit in a wireless communication network employing TDMA.

FIG. 6 is a block diagram illustrating a transmitting unit 610 configured for transmitting data in a burst over a wireless communication network employing Time Division Multiple Access, TDMA. The burst comprises a payload of $N_{DS}$ number of data symbols, such that the data in the burst is represented by symbols in two payload fields, wherein bursts related to $N_{MS}$ number of mobile stations are communicated in a single time slot. The transmitting unit comprises a processing unit 620, which is adapted to group a block of $N_b$ user code bits, representing the data to be transmitted, into $N_{DS}/N_{MS}$ groups of user code bits.

The processing unit 620 is further adapted to map the groups of user code bits to data symbols such that one group is represented by one data symbol, thereby obtaining a block of data symbols, wherein each data symbol is drawn from one or more pre-defined complex-valued symbol constellation(s).

Further, the processing unit 620 is adapted to repeat the block of data symbols such that the burst to be transmitted comprises $N_{MS}$ number of substantially equal blocks of data symbols.

Still further, the processing unit 620 is adapted to rotate the $N_{MS}$ number of blocks of data symbols according to a mobile-station-specific rotation, and to transmit the rotated block of data symbols in a burst in the time slot.

This has the advantage that mutual interference can be avoided or reduced when bursts related to the $N_{MS}$ number of mobile stations are multiplexed into the single time slot.

According to an exemplary embodiment, each of the groups comprises $N_b*N_{MS}/N_{DS}$ number of user code bits.

In one example, the processing unit is 620 further adapted to perform the grouping and mapping by modulation with the order of 2 to the power of $N_b*N_{MS}/N_{DS}$.

In yet an example, the processing unit 620 is further adapted to rotate the $N_{MS}$ number of blocks of symbols by $2\pi(k-1)/N_{DS}$ for mobile station number k, wherein $1 \leq k \leq N_{MS}$.

Figure 7:
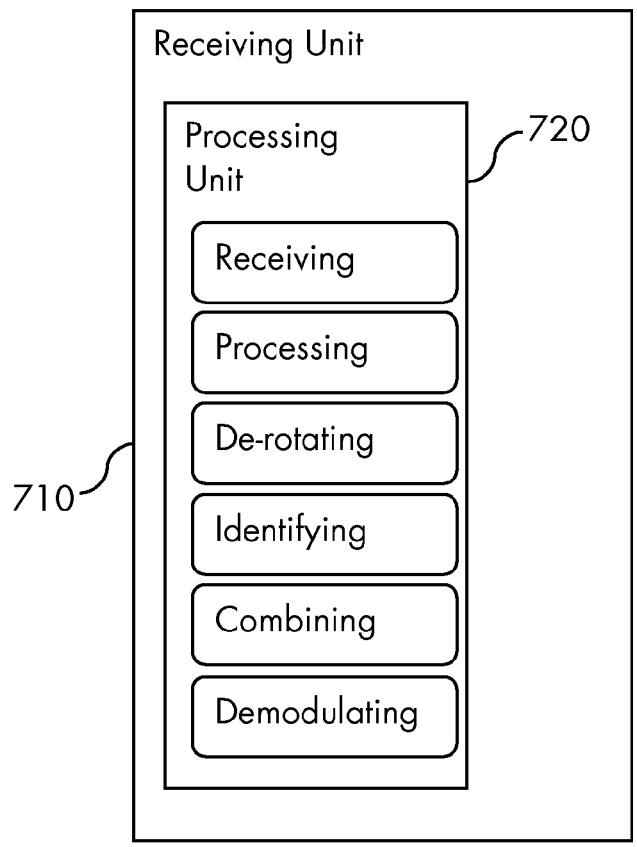
FIG. 7 is a block diagram illustrating a Receiving Unit in a wireless communication network employing TDMA

FIG. 7 is a block diagram illustrating a receiving unit 710 configured for receiving and demodulating data, the received data being transmitted in a signal comprising a burst over a wireless communication network employing Time Division Multiple Access, TDMA. Bursts relating to $N_{MS}$ number of mobile stations are multiplexed into a single time slot. The receiving unit comprising a processing unit 720 adapted to receive the signal by way of a plurality of samples and to process the received samples in order to identify which received samples correspond to data symbols in a payload portion of the burst.

The processing unit 720 is further adapted to de-rotate the data samples according to a mobile-station-specific de-rotation, thereby obtaining a block of de-rotated data samples.

Further, the processing unit 720 is adapted to identify $N_{MS}$ number of symbol blocks, within the block of de-rotated data symbols and to combine the $N_{MS}$ number of symbol blocks thereby obtaining one symbol block.

Still further, the processing unit 720 is adapted to demodulate the symbol block to obtain $N_b$ number of hard or soft bit decisions, $N_b$ being a total number of user code bits conveyed by the data symbols in the payload in the received signal samples of the burst, thereby obtaining a block of hard or soft user code bits.

This has the advantage that mutual interference can be avoided or reduced when bursts related to the $N_{MS}$ number of mobile stations are multiplexed into the single time slot.

According to an exemplary embodiment, the number of user code bits in a group is $N_b*N_{MS}/N_{DS}$.

In an example, the processing unit 720 further is adapted to perform the demodulating by de-modulation with an alphabet or signal constellation of the order of 2 to the power of $N_b*N_{MS}/N_{DS}$.

In yet an example, the processing unit 720 further is adapted to de-rotate the $N_{MS}$ number of blocks of symbols by $2\pi(k-1)/N_{DS}$ for mobile station number k, wherein $1 \leq k \leq N_{MS}$.

Figure 8:
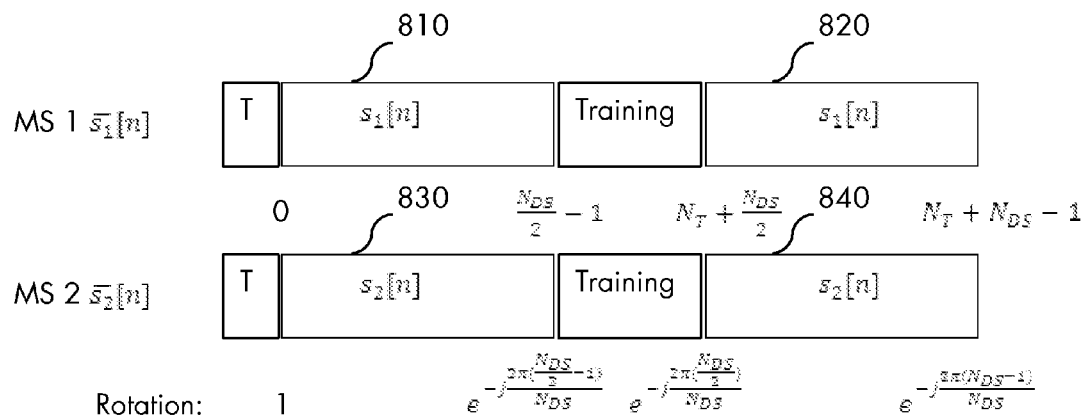
FIG. 8 is an illustration of an example wherein bursts from two mobile stations are multiplexed into one time slot.
Figure 9:
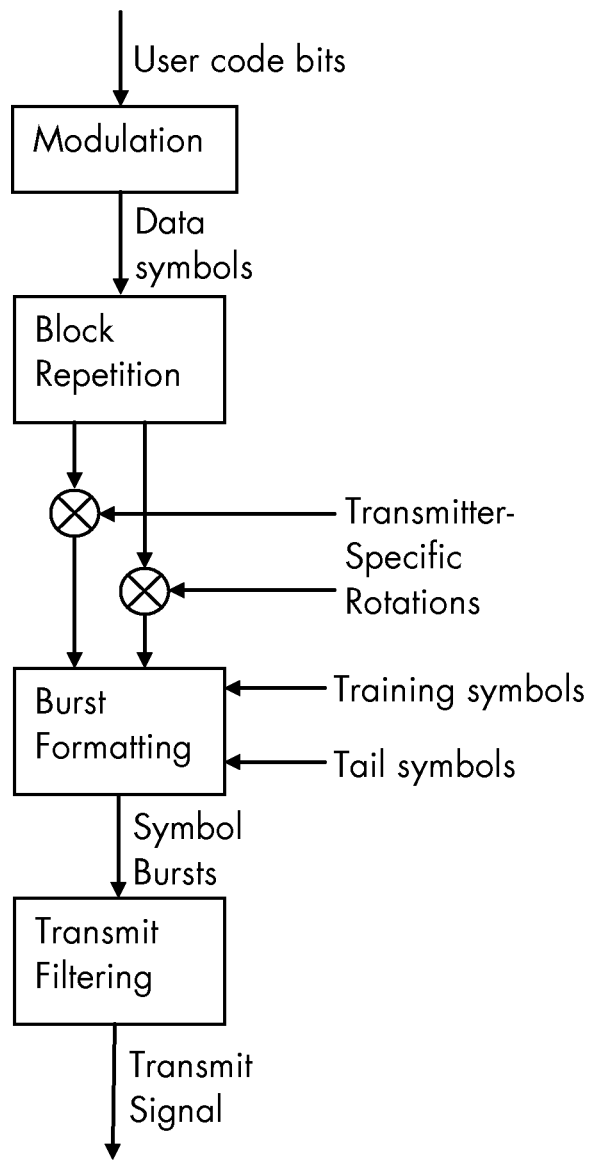
FIG. 9 is a block diagram of the functionality in a transmitter.
Figure 10:
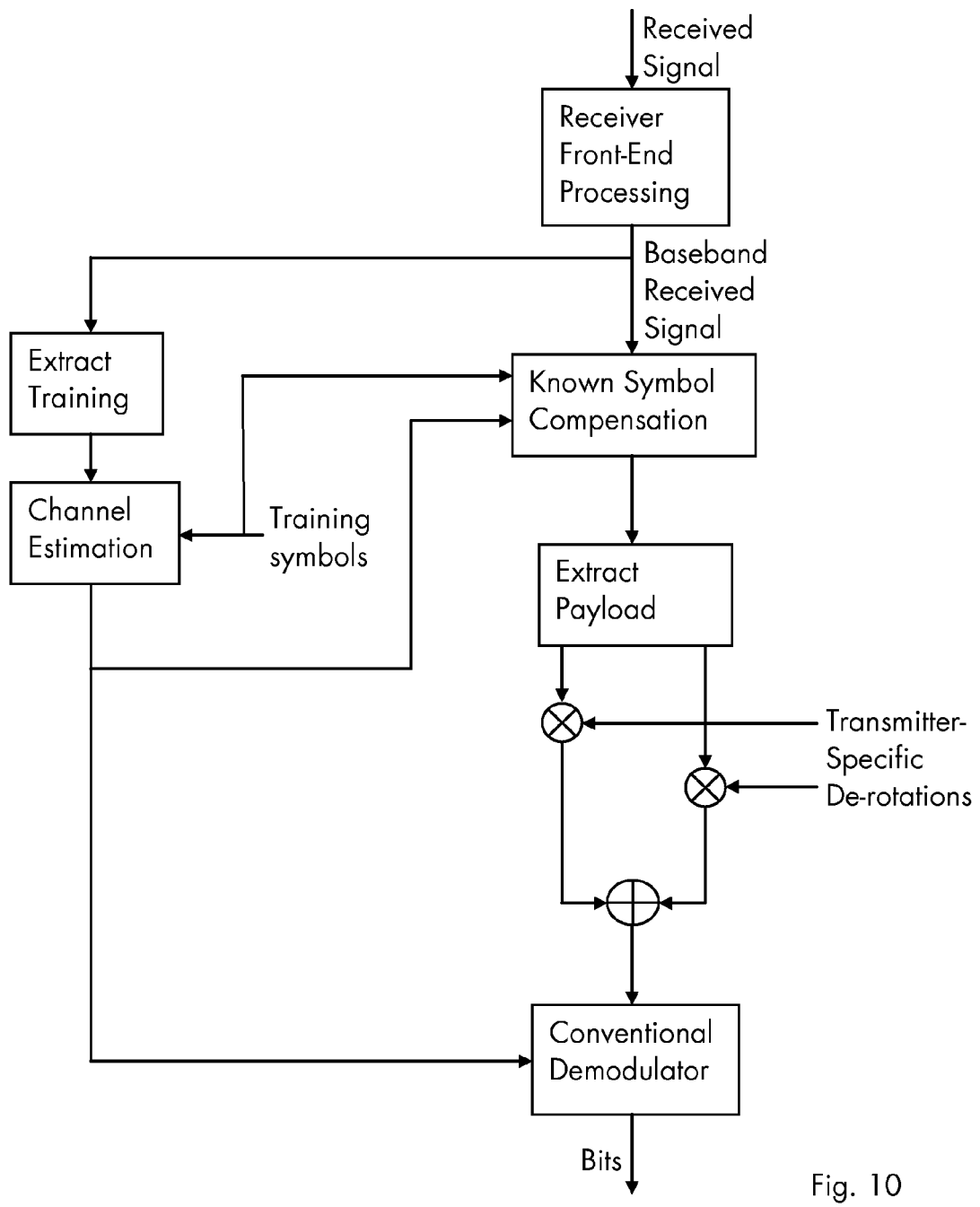
FIG. 10 is a block diagram of the functionality in a receiver.

Turning to FIGS. 8-10, an example of two mobile stations will be described, MS 1 and MS 2. It shall be noted that this is merely an exemplary embodiment.

Let $\underline{s}_1[n]$ and $\underline{s}_2[n]$ denote the symbol blocks to be transmitted for MS 1 and MS 2 respectively. $N_T$ denotes the number of training symbols in the burst and $N_{DS}$ denotes the number of data symbols in the burst. For a GSM system, a burst comprises 26 training symbols and 2*58=116 data symbols. Since there are two mobile stations making use of the same time slot in this example, the symbol block that is to be transmitted must be repeated once so that the burst of each user comprises two equal symbol blocks. In FIG. 8 it is illustrated that the burst, comprising two payload portions, comprises two identical symbol blocks in each payload portion. For MS 1, the symbol block $\underline{s}_1[n]$ is comprised in both payload portion 810 and 820 of its burst. For MS 2, the symbol block $\underline{s}_2[n]$ is comprised in both payload portion 830 and 840 of its burst, however with a $2\pi/N_{DS}$ rotation. This rotation is employed on top of any modulation specific rotation.

Let $$\overline{s_1}[n] = \begin{cases} s_1[n] & \text{for } n \in \left[0, \frac{N_{DS}}{2} - 1\right] \\ s_1\left[n - \frac{N_{DS}}{2} - N_T\right] & \text{for } n \in \left[N_T + \frac{N_{DS}}{2}, N_T + N_{DS} - 1\right] \\ 0 & \text{otherwise} \end{cases}$$

Let $$\overline{s_2}[n] = \begin{cases} e^{j\frac{2\pi n}{N_{DS}}} * s_2[n] & \text{for } n \in \left[0, \frac{N_{DS}}{2} - 1\right] \\ e^{j\frac{2\pi(n-N_T)}{N_{DS}}} s_2\left[n - \frac{N_{DS}}{2} - N_T\right] & \text{for } n \in \left[N_T + \frac{N_{DS}}{2}, N_T + N_{DS} - 1\right] \\ 0 & \text{otherwise} \end{cases}$$

The functionality of the transmitter described above is schematically illustrated in FIG. 9. The figure will not be described in detail as both the method in a transmitting unit and a transmitting unit has already been described.

As the receiver receives the signal comprising the burst, the received signal needs to be processed in order for the receiver to obtain the original signal $s_x[n]$ intended for that receiver, x being 1 or 2 in this example since signals relating to two terminals or mobile stations are being multiplexed into one single time slot.

Let r'[n] denote the received signal after removing any modulation specific rotation when all symbols other than the two payload portions in each burst are set to zero. The received signal r'[n] can be modeled as:

$$r'[n] = \Sigma_{k=0}^{L1-1} h_1[k]\underline{s_1}[n-k] + \Sigma_{k=0}^{L2-1} h_2[k]\underline{s_2}[n-k] + w[n]$$

For all n, where w[n] denotes the noise, $h_1[k]$ and $h_2[k]$ denote the channel to or from MS 1 and MS 2, respectively, depending on whether it is for uplink or downlink communication, and L1 and L2 denote the number of taps in $h_1[k]$ and $h_2[k]$, respectively. Assume that $w[n] \sim N(0, \sigma_w^2)$, and that $h_1[k]$ and $h_2[k]$ remain unchanged over each burst.

The received signal model applies to both uplink and downlink. For the downlink, $h_1[k]=h_2[k]$ when both signals are transmitted from the same antenna.

As the receiver receives the transmitted signal comprising the burst, the receiver needs to demodulate the received signal. The receiver computes:

$$r''_1[n] = \frac{r'[n] + r'\left[n + N_T + \frac{N_{DS}}{2}\right]}{2}$$

$$= \sum_{k=0}^{L_1-1} h_1[k] \frac{\bar{s}_1[n-k] + \bar{s}_1\left[n + N_T + \frac{N_{DS}}{2} - k\right]}{2} +$$

$$\sum_{k=0}^{L_2-1} h_2[k] \frac{\bar{s}_2[n-k] + \bar{s}_2\left[n + N_T + \frac{N_{DS}}{2} - k\right]}{2} +$$

$$\frac{w[n] + w\left[n + N_T + \frac{N_{DS}}{2}\right]}{2}$$

$$= \sum_{k=0}^{L_1-1} h_1[k] s_1[n-k] + \sum_{k=0}^{L_2-1} h_2[k] s_2[n-k]$$

$$\frac{e^{j\frac{2\pi(n-k)}{N_{DS}}} + e^{j\frac{2\pi\left(n-k+\frac{N_{DS}}{2}\right)}{N_{DS}}}}{2} + \frac{w[n] + w\left[n + N_T + \frac{N_{DS}}{2}\right]}{2}$$

$$= \sum_{k=0}^{L_1-1} h_1[k] s_1[n-k] + \sum_{k=0}^{L_2-1} h_2[k] s_2[n-k]$$

$$e^{j\frac{2\pi(n-k)}{N_{DS}}} \frac{1+e^{j\pi}}{2} + \frac{w[n] + w\left[n + N_T + \frac{N_{DS}}{2}\right]}{2}$$

$$= \sum_{k=0}^{L_1-1} h_1[k] s_1[n-k] + \frac{w[n] + w\left[n + N_T + \frac{N_{DS}}{2}\right]}{2}$$

wherein $$w''_1[n] = \frac{w[n] + w\left[n + N_T + \frac{N_{DS}}{2}\right]}{2}$$

and $$n \in \left[0, \frac{N_{DS}}{2} - 1\right].$$

Note that $\sigma_{w'_1}^2 \equiv E|w''_1[n]|^2 = \sigma_w^2/2$ so there is a 3 dB reduction in effective noise power due to the repetition. Hence, barring on channel estimation error, there is no interference from the transmission of mobile station 2, MS 2.

For MS 2, the receiver computes:

$$r''_2[2] = \frac{e^{-j\frac{2\pi n}{N_{DS}}} r'[n] + e^{-j\frac{2\pi\left(n+\frac{N_{DS}}{2}\right)}{N_{DS}}} r'\left[n + N_T + \frac{N_{DS}}{2}\right]}{2}$$

$$= \sum_{k=0}^{L_1-1} h_1[k] e^{-j\frac{2\pi k}{N_{DS}}} \frac{\bar{s}_1[n-k] e^{-j\frac{2\pi(n-k)}{N_{DS}}} +}{2}$$

$$\frac{\bar{s}_1\left[n + N_T + \frac{N_{DS}}{2} - k\right] e^{-j\frac{2\pi\left(n+\frac{N_{DS}}{2}-k\right)}{N_{DS}}}}{2} +$$

$$\sum_{k=0}^{L_2-1} h_2[k] e^{-j\frac{2\pi k}{N_{DS}}} \frac{\bar{s}_2[n-k] e^{-j\frac{2\pi(n-k)}{N_{DS}}} +}{2}$$

$$\frac{\bar{s}_2\left[n + N_T + \frac{N_{DS}}{2} - k\right] e^{-j\frac{2\pi\left(n+\frac{N_{DS}}{2}-k\right)}{N_{DS}}}}{2} +$$

$$\frac{e^{-j\frac{2\pi n}{N_{DS}}} w[n] + e^{-j\frac{2\pi\left(n+\frac{N_{DS}}{2}\right)}{N_{DS}}} w\left[n + N_T + \frac{N_{DS}}{2}\right]}{2}$$

$$= \sum_{k=0}^{L_1-1} h_1[k] e^{-j\frac{2\pi k}{N_{DS}}} s_1[n-k] e^{-j\frac{2\pi(n-k)}{N_{DS}}} \frac{1 + e^{-j\frac{2\pi\left(\frac{N_{DS}}{2}\right)}{N_{DS}}}}{2} +$$

$$\sum_{k=0}^{L_2-1} h_2[k] e^{-j\frac{2\pi k}{N_{DS}}} s_2[n-k] \frac{e^{j\frac{2\pi(n-k)}{N_{DS}}} e^{-j\frac{2\pi(n-k)}{N_{DS}}} +}{2}$$

$$\frac{e^{j\frac{2\pi\left(n-k+\frac{N_{DS}}{2}\right)}{N_{DS}}} e^{-j\frac{2\pi\left(n-k+\frac{N_{DS}}{2}\right)}{N_{DS}}}}{2} +$$

$$\frac{e^{-j\frac{2\pi n}{N_{DS}}} w[n] + e^{-j\frac{2\pi\left(n+\frac{N_{DS}}{2}\right)}{N_{DS}}} w\left[n + N_T + \frac{N_{DS}}{2}\right]}{2}$$

$$= \sum_{k=0}^{L_1-1} h_1[k] e^{-j\frac{2\pi n}{N_{DS}}} s_1[n-k] \frac{1+e^{-j\pi}}{2} + \sum_{k=0}^{L_2-1} h_2[k] e^{-j\frac{2\pi k}{N_{DS}}} s_2[n-k] +$$

$$\frac{e^{-j\frac{2\pi n}{N_{DS}}} w[n] + e^{-j\frac{2\pi\left(n+\frac{N_{DS}}{2}\right)}{N_{DS}}} w\left[n + N_T + \frac{N_{DS}}{2}\right]}{2}$$

$$= \sum_{k=0}^{L_2-1} h_2[k] e^{-j\frac{2\pi k}{N_{DS}}} s_2[n-k] +$$

$$\frac{e^{-j\frac{2\pi n}{N_{DS}}} w[n] + e^{-j\frac{2\pi\left(n+\frac{N_{DS}}{2}\right)}{N_{DS}}} w\left[n + N_T + \frac{N_{DS}}{2}\right]}{2}$$

wherein $w''_1[n] = \dfrac{e^{-j\frac{2\pi n}{N_{DS}}} w[n] + e^{-j\frac{2\pi\left(n+\frac{N_{DS}}{2}\right)}{N_{DS}}} w\left[n + N_T + \frac{N_{DS}}{2}\right]}{2}$ and $$n \in \left[0, \frac{N_{DS}}{2} - 1\right].$$

Note that $\sigma_{w'_1}^2 \equiv E|w'_1[n]|^2 = \sigma_w^2/2$ so there is a 3 dB reduction in effective noise power due to the repetition. The effective channel response for MS 2 after combining is $$h_2[k] e^{-j\frac{2\pi k}{N_{DS}}}.$$

Hence barring on channel estimation error, there is no interference from transmission of MS 1. It shall be noted that each terminal only needs to demodulate half of the payload in order to obtain its own data.

The functionality of the receiving unit described above is schematically illustrated in FIG. 10. Since the method in a receiving unit as well as a receiving unit has been described before, this figure will not be described in detail.

As has been described above, a burst comprises tail symbols at the beginning of the burst, and it also comprises training symbols in the middle of the two payload fields in the burst. Since the tail symbols transmitted before the first half payload are not identical to the training symbols transmitted before the second half payload, the derivation above does not hold in the presence of the training and tail symbols in a normal burst. However, their impact can be compensated by pre-subtracting their responses from the received signal before the combining process described above, assuming that the receiver(s) know(s) the training sequence and tail sequence transmitted to/by the other Terminal.

Figure 11:
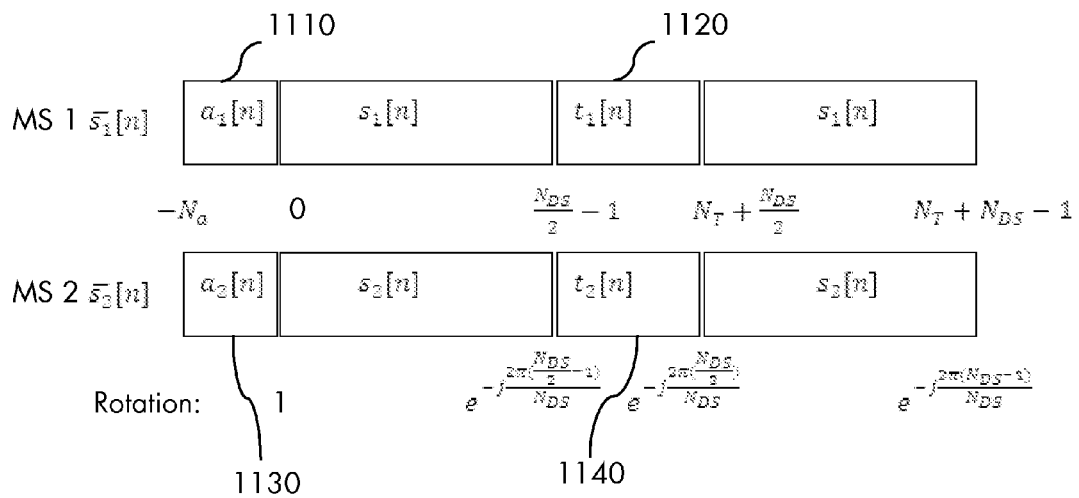
FIG. 11 is an illustration for the compensation for unmatched training and tail symbols.

With reference to FIG. 11, in more detail, let $\{a_i[n]\}_{n=0}^{N_a-1}$ be the tail symbols 1110, 1130 for MS i, and $a_2[n]=a_1[n]$, where $N_a=3$. Similarly, let $\{t_i[n]\}_{n=0}^{N_T-1}$ be the training symbols 1120, 1140 for MS i, where $N_T=26$. We extend the definitions of $a_i[n]$ and $t_i[n]$ to all n with zeros outside their respective supports.

$$\tilde{s}_1[n] = \begin{cases} s_1[n] & \text{for } n \in \left[0, \frac{N_{DS}}{2} - 1\right] \\ s_1\left[n - \frac{N_{DS}}{2} - N_T\right] & \text{for } n \in \left[N_T + \frac{N_{DS}}{2}, N_T + N_{DS} - 1\right] \\ a_1[n + N_a] & \text{for } n \in [-N_a, -1] \\ t_1\left[n - \frac{N_{DS}}{2}\right] & \text{for } n \in \left[\frac{N_{DS}}{2}, N_T + \frac{N_{DS}}{2} - 1\right] \end{cases}$$

$$\tilde{s}_2[n] = \begin{cases} e^{j\frac{2\pi n}{N_{DS}}} s_2[n] & \text{for } n \in \left[0, \frac{N_{DS}}{2} - 1\right] \\ e^{j\frac{2\pi(n-N_T)}{N_{DS}}} s_2\left[n - \frac{N_{DS}}{2} - N_T\right] & \text{for } n \in \left[N_T + \frac{N_{DS}}{2}, N_T + N_{DS} - 1\right] \\ e^{j\frac{2\pi n}{N_{DS}}} a_2[n + N_a] & \text{for } n \in [-N_a, -1] \\ e^{j\frac{2\pi(n-N_T)}{N_{DS}}} t_2\left[n - \frac{N_{DS}}{2}\right] & \text{for } n \in \left[\frac{N_{DS}}{2}, N_T + \frac{N_{DS}}{2} - 1\right] \end{cases}$$

Let r[n] denote the received signal after removing the modulation specific rotation, when tail, payload and training symbols are transmitted in a normal manner as shown in FIG. 11. The received signal can then be modeled as:

$$r[n] = \sum_{k=0}^{L_1-1} h_1[k] \tilde{s}_1[n-k] + \sum_{k=0}^{L_2-1} h_2[k] \tilde{s}_2[n-k] + w[n]$$

for all n.
This gives that $$r'[n] = r[n] - \sum_{k=0}^{L_1-1} h_1[k] a_1[n + N_a - k] - \sum_{k=0}^{L_1-1} h_1[k] t_1\left[n - \frac{N_{DS}}{2} - k\right] - \sum_{k=0}^{L_2-1} h_2[k] a_2[n + N_a - k] - \sum_{k=0}^{L_2-1} h_2[k] t_2\left[n - \frac{N_{DS}}{2} - k\right]$$

Consequently, the receiver can easily construct r'[n] from r[n] with the knowledge of the channel responses.

Typically, mobile stations will transmit and/or receive in more than just one frame. The mobile stations will typically be assigned a specific time slot in a frame, which time slot will remain the same in several frames during a session. Although the specific slot may be the same in each of the plurality of frames, the mobile-station-specific rotations may vary from frame to frame. This may be advantageous for several reasons. Repeating the blocks of data symbols is equivalent to sub-sampling in the frequency domain. The power spectrum of the transmission of each mobile station spans the same 200 kHz channel, in the example when the TDMA communication system is GSM, with nulls or fades roughly spaced every $200/N_{DS}$ kHz. After removing the impact of tail and training symbols, the nulls of the users are non-overlapping but interleaved with each other. To obtain a less "spiky" power spectra, the transmission formats of the mobile stations can regularly or pseudo regularly be switched from one burst to another. The resulting power spectra should have the same shape as the normal GSM transmissions.

Further, since the frequency span of each mobile terminal's signal is the same, the amount of channel dispersion experienced by each mobile terminal should be similar as the normal GSM transmissions.

The example above describes two mobile stations being multiplexed into one time slot. When generalized to any even M number of mobile stations, the modulation constellation should increase correspondingly to accommodate the coded bits for each mobile station. For example, to accommodate four mobile stations in one single time slot, one mobile station may need to repeat 16-QAM symbols instead of QPSK symbols as in the example above with two mobile stations. More specifically, for mobile station number i:

$$\tilde{s}_i[n] = \begin{cases} e^{j\frac{2\pi(i-1)n}{N_{DS}}} s_i\left[\text{mod}\left(n, \frac{N_{DS}}{M}\right)\right] & \text{for } n \in \left[0, \frac{N_{DS}}{2} - 1\right] \\ e^{j\frac{2\pi(i-1)(n-N_T)}{N_{DS}}} s_i\left[\text{mod}\left(n - \frac{N_{DS}}{2} - N_T, \frac{N_{DS}}{M}\right)\right] & \text{for } n \in \left[N_T + \frac{N_{DS}}{2}, N_T + N_{DS} - 1\right] \\ 0 & \text{otherwise} \end{cases}$$

for i=1, 2, . . . , M. The receivers can demodulate the data symbols for MS i based on the combined signal given by:

$$r'_i[n] = \frac{1}{M} \left[ \sum_{m=0}^{\frac{M}{2}-1} e^{-j\frac{2\pi(i-1)\left(n + m\frac{N_{DS}}{M}\right)}{N_{DS}}} r'\left[n + m\frac{N_{DS}}{M}\right] + \sum_{m=0}^{\frac{M}{2}-1} e^{-j\frac{2\pi(i-1)\left(n + m\frac{N_{DS}}{M} + \frac{N_{DS}}{2}\right)}{N_{DS}}} r'\left[n + m\frac{N_{DS}}{M} + N_T + \frac{N_{DS}}{2}\right] \right]$$

for $$n \in \left[0, \frac{N_{DS}}{M} - 1\right] \text{ and } i = 1, 2, \ldots, M.$$

The resulting noise power can be reduced by a factor of M.

Figure 12:
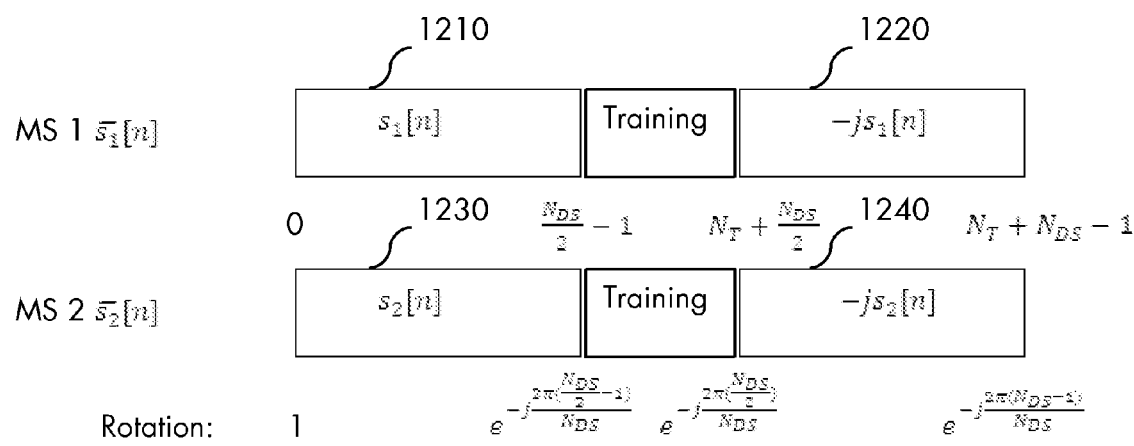
FIG. 12 illustrates legacy receivers receiving a signal comprising a burst having multiple equal blocks of data symbols, when the legacy receiver is unaware of the multiplexing technique.

In order to support backward compatibility, such that a legacy receiver may be able to demodulate a received signal, which signal has bursts relating to a plurality of mobile stations multiplexed into a single time slot, the real and imaginary parts of the second payload half can be switched as is illustrated in FIG. 12.

The receiver can remove the constant phase shift by multiplying j on the received signal over the second half payload 1220, 1240 before combining with that of the first payload 1210, 1230. A legacy receiver would treat the transmission on the other quadrature component and the transmission for the other user as noise. The legacy receiver will not have knowledge of the true underlying transmission structure. Therefore, the self-interference caused by the quadrature component and the other user interference can significantly reduce the resulting Signal to Interference plus Noise Ratio, SINR.

It should be noted that FIGS. 6-7 merely illustrate various functional units in the Transmitting Unit and in the Receiving Unit in a logical sense. However, the skilled person is free to implement these functions in practice using any suitable software and hardware means. Thus, the invention is generally not limited to the shown structures of the Transmitting Unit and in the Receiving Unit and the functional units.

While the invention has been described with reference to specific exemplary embodiments, the description is generally only intended to illustrate the inventive concept and should not be taken as limiting the scope of the invention. The present invention is defined by the appended claims.

The invention claimed is:

1. A method, in a transmitting apparatus, for transmitting data in a burst over a wireless communication network employing Time Division Multiple Access (TDMA), said burst comprising a payload of $N_{DS}$ data symbols, such that the data in said burst is represented by a block of data symbols, wherein bursts related to $N_{MS}$ mobile stations are communicated in a single time slot, the method comprising:
   grouping a block of $N_b$ user code bits, representing the data to be transmitted, into $N_{DS}/N_{MS}$ groups of user code bits;
   mapping said groups of user code bits to data symbols such that one group is represented by one data symbol, thereby obtaining a block of data symbols, wherein each data symbol is drawn from one or more pre-defined complex-valued symbol constellations;
   repeating said block of data symbols, such that the burst to be transmitted comprises $N_{MS}$ equal blocks of data symbols;
   rotating said $N_{MS}$ blocks of data symbols according to a mobile-station-specific rotation; and
   transmitting said rotated blocks of data symbols in a burst in said time slot.

2. The method of claim 1, wherein each of said groups comprises $N_b*N_{MS}/N_{DS}$ user code bits.

3. The method of claim 1, wherein said grouping and mapping is performed by modulation with the order of 2 to the power of $N_b*N_{MS}/N_{DS}$.

4. The method of claim 1, wherein said $N_{MS}$ blocks of symbols are rotated by $2\pi(k-1)/N_{DS}$ for mobile station number k, wherein $1 \leq k \leq N_{MS}$.

5. The method of claim 1, wherein said wireless communication network is a GSM system and $N_{DS}$ is 116 at normal symbol rate or $N_{DS}$ is 138 at higher symbol rate.

6. A method in a control node, in a wireless communication network employing Time Division Multiple Access (TDMA) for multiplexing bursts relating to $N_{MS}$ mobile stations into a single time slot, the method comprising:
   assigning mobile-station-specific rotations to each of said mobile stations; and
   assigning said single time slot to each of said mobile stations,
   wherein said mobile-station-specific rotation for mobile station k, in relation to other mobile stations in said single time slot, is $2\pi(k-1)/N_{DS}$, where $N_{DS}$ is the number of data symbols in the payload of said burst in said single time slot and $1 \leq k \leq N_{MS}$.

7. A method, in a receiving apparatus, for receiving and demodulating data, the received data being transmitted in a signal in a burst over a wireless communication network employing Time Division Multiple Access (TDMA) wherein bursts relating to $N_{MS}$ mobile stations are multiplexed into a single time slot, the method comprising:
   receiving said signal by way of a plurality of samples;
   processing said received samples in order to identify which received samples correspond to data symbols in a payload portion of said burst;
   de-rotating said data samples according to a mobile-station-specific de-rotation, thereby obtaining a block of de-rotated samples;
   identifying $N_{MS}$ sample blocks, within said block of de-rotated samples;
   combining said $N_{MS}$ sample blocks, thereby obtaining one block of samples; and
   demodulating said block of samples to obtain $N_b$ hard or soft bit decisions, $N_b$ being a total number of user code bits conveyed by said data symbols in said payload in said received signal samples of said burst, thereby obtaining a block of hard or soft user code bits.

8. The method of claim 7, wherein the number of user code bits in a group is $N_b*N_{MS}/N_{DS}$.

9. The method of claim 7, wherein said demodulating is performed by demodulation of said signal with a constellation of the order of 2 to the power of $N_b*N_{MS}/N_{DS}$.

10. The method of claim 7, wherein said $N_{MS}$ blocks of symbols are de-rotated by $2\pi(k-1)/N_{DS}$ for mobile station k, wherein $1 \leq k \leq N_{MS}$.

11. The method of claim 7, wherein in said wireless communication network is a GSM system and $N_{DS}$ is 116 at normal symbol rate or $N_{DS}$ is 138 at higher symbol rate.

12. A transmitting apparatus configured for transmitting data in a burst over a wireless communication network employing Time Division Multiple Access (TDMA), the burst comprising a payload of $N_{DS}$ data symbols, such that the data in said burst is represented by a block of data symbols, wherein bursts related to $N_{MS}$ mobile stations are communicated in a single time slot, said transmitting apparatus comprising a processing unit configured to:
   group a block of $N_b$ user code bits, representing the data to be transmitted, into $N_{DS}/N_{MS}$ groups of user code bits;
   map said groups of user code bits to data symbols such that one group is represented by one data symbol, thereby obtaining a block of data symbols, wherein each data symbol is drawn from one or more pre-defined complex-valued symbol constellations;
   repeat said block of data symbols such that the burst to be transmitted comprises $N_{MS}$ equal blocks of data symbols;
   rotate said $N_{MS}$ blocks of data symbols according to a mobile-station-specific rotation; and
   transmit said rotated block of data symbols in a burst in said time slot.

13. The transmitting apparatus of claim 12, wherein each of said groups comprises $N_b*N_{MS}/N_{DS}$ user code bits.

14. The transmitting apparatus of claim 12, wherein said processing unit is further adapted to perform said grouping and mapping by modulation with the order of 2 to the power of $N_b*N_{MS}/N_{DS}$.

15. The transmitting apparatus of claim 12, wherein said processing unit is further adapted to rotate said $N_{MS}$ blocks of symbols by $2\pi(k-1)/N_{DS}$ for mobile station k, wherein $1 \leq k \leq N_{MS}$.

16. A receiving apparatus configured for receiving and demodulating data, the received data being transmitted in a signal comprising a burst over a wireless communication network employing Time Division Multiple Access (TDMA), wherein bursts relating to $N_{MS}$ mobile stations are multiplexed into a single time slot, said receiving apparatus comprising a processing unit configured to:

receive said signal by way of a plurality of samples;

process said received samples in order to identify which received samples correspond to data symbols in a payload portion of said burst;

de-rotate said samples according to a mobile-station-specific de-rotation, thereby obtaining a block of de-rotated samples;

identify $N_{MS}$ blocks of samples, within said block of de-rotated samples;

combine said $N_{MS}$ blocks of samples, thereby obtaining one block of samples; and demodulate said block of samples to obtain $N_b$ hard or soft bit decisions, $N_b$ being a total number of user code bits conveyed by said data symbols in said payload in said received signal samples of said burst, thereby obtaining a block of hard or soft user code bits.

17. The receiving apparatus of claim 16, wherein the number of user code bits in a group is $N_b * N_{MS}/N_{DS}$.

18. The receiving apparatus of claim 16, wherein said processing unit is further adapted to perform said demodulating by demodulation with a constellation of the order of 2 to the power of $N_b * N_{MS}/N_{DS}$.

19. The receiving apparatus according to claim 16, wherein said processing unit is further adapted to de-rotate said $N_{MS}$ blocks of symbols by $2\pi(k-1)/N_{DS}$ for mobile station number k, wherein $1 \leq k \leq N_{MS}$.

\* \* \* \* \*